United States Patent [19]
Jennings

[11] Patent Number: 6,109,171
[45] Date of Patent: Aug. 29, 2000

[54] STRUCTURE AND METHOD OF A WIND SCREEN FOR A COTTON MODULE BUILDER

[75] Inventor: James H. Jennings, Muleshoe, Tex.

[73] Assignee: Leo J. Ruzicka, Labbock, Tex.

[21] Appl. No.: 09/025,893

[22] Filed: Feb. 18, 1998

[51] Int. Cl.[7] .................................................... B30B 9/30

[52] U.S. Cl. ...................... 100/35; 56/DIG. 2; 100/226; 296/100.01; 414/346; 414/406

[58] Field of Search ............... 100/35, 100, 215, 100/226; 56/1, 16.6, DIG. 2; 220/729, 731; 296/100.01, 100.11, 100.12, 100.14, 101, 210; 414/132, 345, 346, 406, 407

[56] References Cited

U.S. PATENT DOCUMENTS

| | | |
|---|---|---|
| 689,237 | 12/1901 | Smith ...................................... 100/215 |
| 2,524,003 | 9/1950 | Wallace ................................... 414/132 |
| 3,130,845 | 4/1964 | French et al. ............................ 414/406 |
| 3,703,966 | 11/1972 | Jones et al. ............................. 100/100 |
| 3,839,852 | 10/1974 | Jebens .................................... 100/100 |
| 4,200,330 | 4/1980 | Scott . |
| 4,210,407 | 7/1980 | Broyhill et al. ........................ 414/407 |
| 4,230,359 | 10/1980 | Smith . |
| 5,167,185 | 12/1992 | Bass, III . |

FOREIGN PATENT DOCUMENTS

| | | | |
|---|---|---|---|
| 2630718 | 11/1989 | France | ................................... 100/226 |
| 1250203 | 8/1986 | U.S.S.R. | ................................. 100/100 |

*Primary Examiner*—Stephen F. Gerrity
*Attorney, Agent, or Firm*—Wendell Coffee; Mark Scott

[57] ABSTRACT

The invention is an air permeable screen that extends upward from a leeward wall of a cotton module maker. The screen is used to prevent cotton being dumped into said module maker from being blown away by wind.

16 Claims, 2 Drawing Sheets

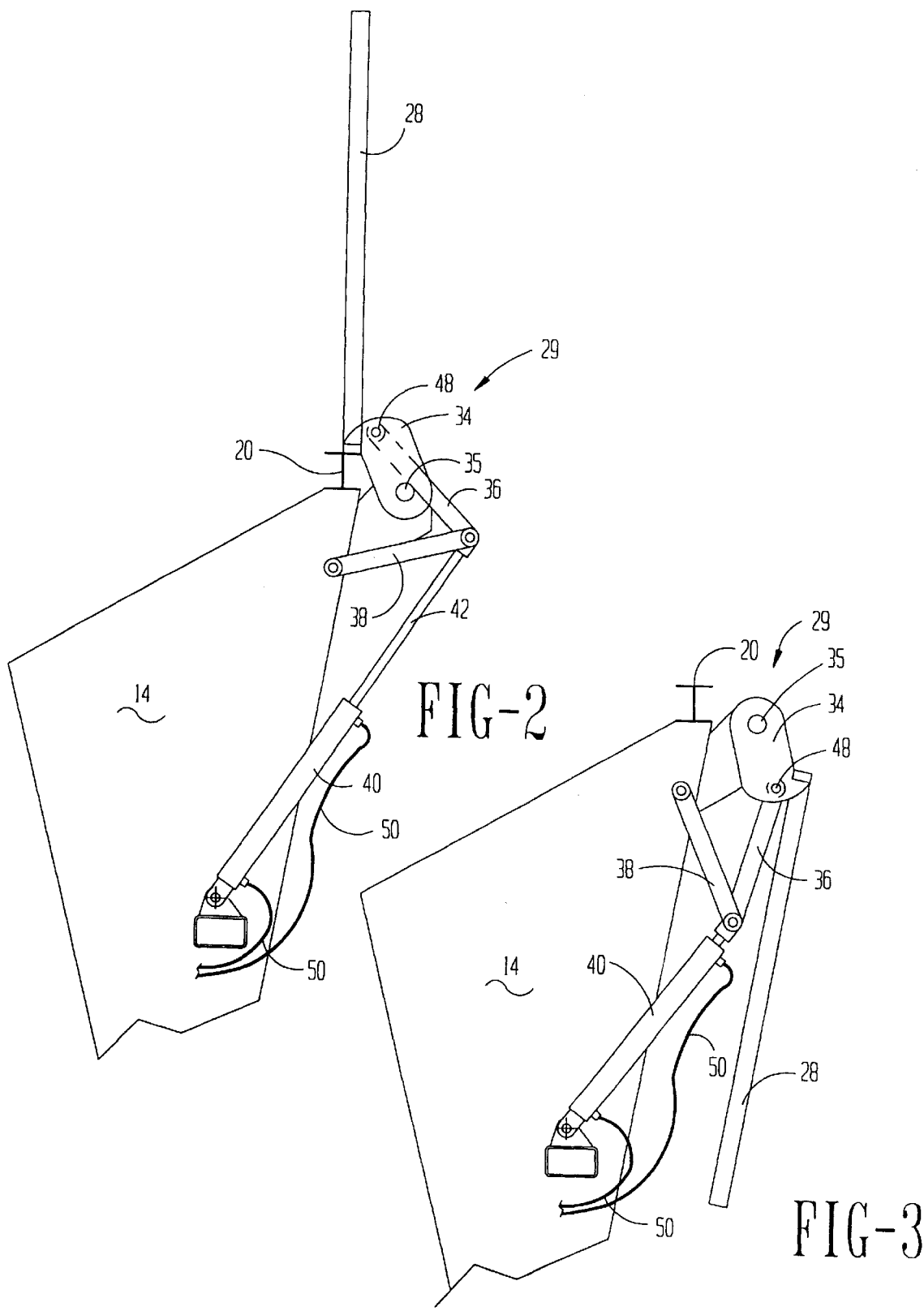

6,109,171

STRUCTURE AND METHOD OF A WIND SCREEN FOR A COTTON MODULE BUILDER

CROSS REFERENCE TO RELATED APPLICATION

None, however, Applicant filed Disclosure Document Number 426911 on Nov. 17, 1997 which document concerns this application; therefore, by separate paper it is respectfully requested that the document be retained and acknowledgment thereof made by the Examiner. (MoPEP 1706)

BACKGROUND OF THE INVENTION (1) Field of the Invention

This invention pertains to a method and related structure of reducing the amount of cotton carried away by wind during module building operations. Cotton farmers have ordinary skill in this art.

(2) Description of the Related Art

Cotton module builders 10 are well known in the related art. Cotton module builders may be more aptly described as seed cotton compactors. Cotton module builders are generally large box-shaped pieces of equipment wherein seed cotton, stripped from the plants in the field, is dumped and then compacted to form large modules. The compaction produces not only a high density of cotton in the module, but also makes easier the movement of the cotton from the field to the gin.

More specifically, cotton module builders have two sidewalls 12 and 14, a front wall 16, and a back door 18. The windward wall and leeward wall have the same length "L". The side walls and front wall each have a height "H". The module builder does not have a floor as it is against the ground that the cotton is compacted. Extending along the top of the walls are rails 20. The rails play host for a bridge 22 mechanism that has the capability of moving between the front wall and the back door. Mounted on this bridge is a packer 24 that usually comprises one or more hydraulic cylinders and a large anvil connected thereto. The purpose of this bridge and packer assembly is to level the cotton within the module builder and then pack the cotton.

Operation of a cotton module builder then is as follows. The module builder 10 is located in the field proximate to where cotton is being stripped from the plants. The module builder is placed so that a particular wall, the windward wall (not shown), always faces the direction of the prevailing wind. The other wall, the leeward wall 14, of course, faces away from the direction of the prevailing wind and also has connections for hydraulic hoses 26 that extend to and operate the bridge and packer assemblies. The back door is closed and locked.

Cotton strippers have a certain capacity for storing cotton stripped from the plants on-board, but as this capacity is filled the cotton strippers must dump their stripped cotton into the module builder, or into a cotton cart or bowl buggy that then dumps the cotton into the module builder. This dumping into the builder is accomplished by placing the cotton stripper or cotton cart near the windward wall, and then the cotton is simply dumped over the windward wall into the module builder. Once the dumping operation is complete, the cotton stripper, if used, can continue its stripping operations. Meanwhile, an operator of the module builder uses the bridge and packer assemblies to level and then compress the cotton against the ground. The internal walls of the module builder are sloped such that the upper portion of the module to be built will have a smaller size than the lower portion. In other words, the module will have a taper being wider at the bottom and smaller at the top. This operation of dumping, leveling and compressing may occur several times before enough cotton has been dumped into the module maker to complete a full size module.

Once the compressing and building of the module is complete, the back door of the module builder is unlocked and opened. Wheels on the sidewalls of the module builder move down by operation of a hydraulic cylinder to slightly raise the module builder from the ground. This raising, by virtue of the taper on the inside of the module builder removes contact of the module builder from the module itself. The module builder is then drug, usually by tractor, away from the module which remains in place and is able to slide out of the module builder by virtue of the open door.

The module builder is then set up again with the windward wall facing the prevailing wind, the back door is locked and the operation continued.

As the foregoing discussion implies, wind is a major factor in determining the placement and use of the module builder. Seed cotton, by virtue of what it is, has relatively low density for its volume. This means that cotton stripped from the plants is easily carried by wind. Although it is certainly a defensive measure to dump the stripped cotton from the cotton stripper into the module builder over the windward wall, strong winds can easily blow the cotton over the leeward wall of the module builder where it is lost unless picked up by hand.

SUMMARY OF THE INVENTION (1) Progressive Contribution to the Art

This invention relates to the problems associated with wind carrying away stripped cotton before it can be compressed into modules in a module builder. The screen is raised during dumping and retracted during packing operations to level and pack cotton. This invention mitigates the loss of cotton, as carried away by wind, by catching said cotton before it escapes over the leeward wall.

(2) Objects of this Invention

An object of this invention is to reduce the cotton loss to wind in module building operations.

Another object of this invention is to reduce the amount of cotton lost to wind with a method and structure that may be easily adapted to existing cotton module builders.

Other objects are to achieve the above with devices that are sturdy, compact, durable, lightweight, simple, safe, efficient,versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require skilled people to install, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 2 is a cross-sectional view, screen up.

FIG. 3 is a cross-sectional view, screen down.

CATALOGUE OF ELEMENTS

Figure 1:
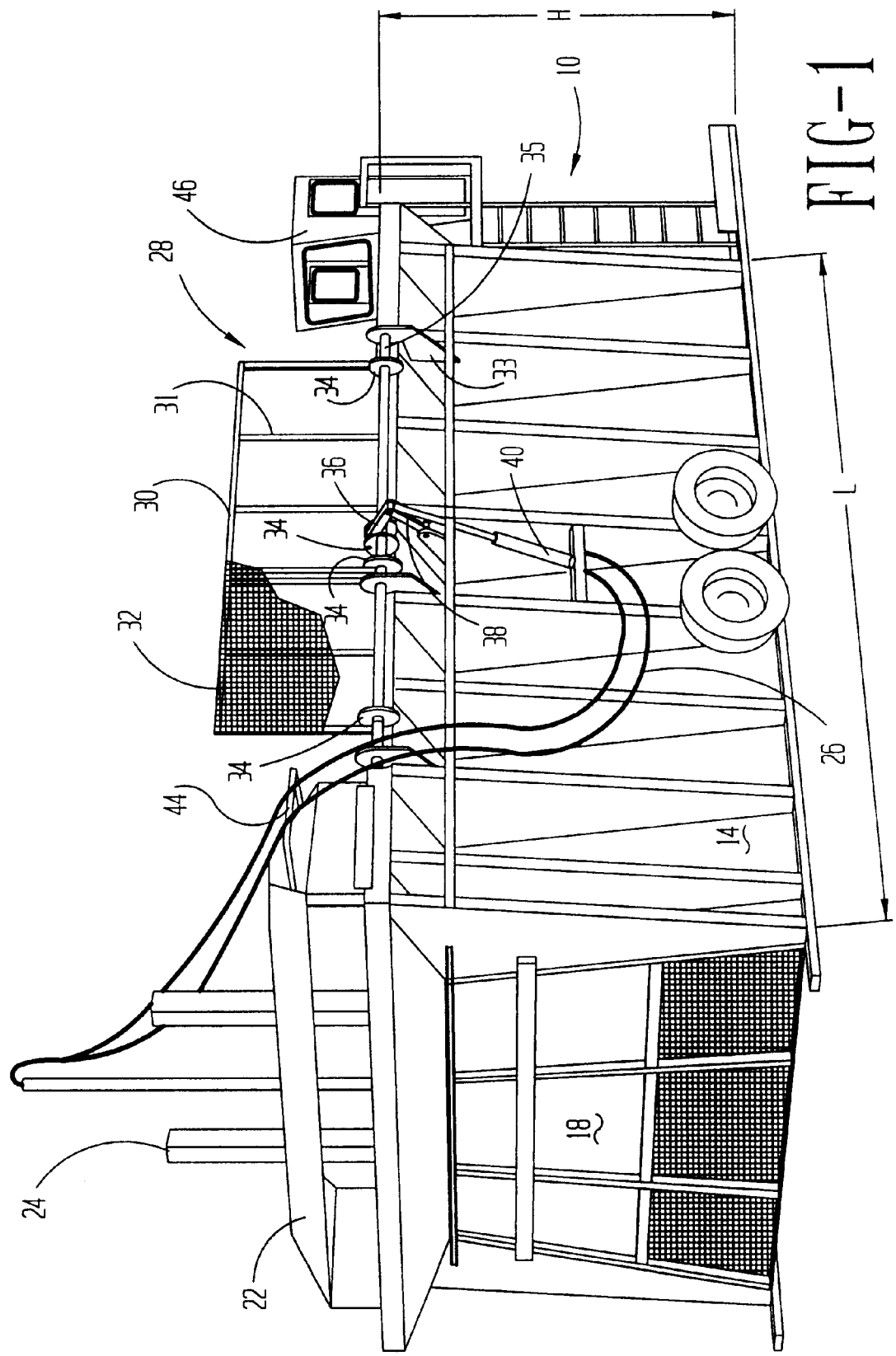
FIG. 1 is a perspective view of a module builder with the screen attached.

As an aid to correlating the terms of the claims to the exemplary drawing(s), the following catalog of elements and steps is provided:

10 cotton module maker
14 leeward wall
16 front wall
18 back door
20 rails
22 bridge
24 packer
26 hoses
28 screen
29 overall hinge
30 frame
31 vertical support
32 wire mesh
33 lower hinge brackets
34 upper hinge brackets
35 hinge shaft
36 upper leg
38 lower leg
40 hydraulic cylinder
42 rod
44 arm
46 cab
48 upper hinge
50 hoses, hydraulic cylinder L length of walls
H height of walls

DESCRIPTION OF THE PREFERRED EMBODIMENTS(S)

Construction of the invention begins by building a frame 30 upon which to place the wire mesh 32. Any suitable frame material may be used including smaller sizes of square tubing or angle iron. The frame of the embodiment shown generally in the drawings is about four feet high and twenty four feet long. The dimensions of the wind screen are subject to change based on the size of the module builder. However, the height of the wind screen will always be approximately ⅔ the height of the leeward wall, and the length of the wind screen will always be approximately ¾ the length of the leeward wall. The frame should have several vertical support pieces 31 to help stabilize the frame 30 and add support for the wire mesh 32. The wire mesh 32 is then attached to the frame 30 by any suitable means capable of withstanding wind, such as by tack welding.

The frame 30 is hinged at hinge 29 to rotate about an upper portion of the leeward wall 14. Several upper hinge brackets 34 are connected on a lower portion of the frame 30. Complementary lower hinge brackets 33 are connected to an upper portion of the leeward wall 14. The overall hinge 29 then is created by placing a hinge shaft 35 to extend the length of the frame 30 and further running through each upper and lower hinge bracket 34 and 33. The frame 30, wire mesh 32 and upper hinge brackets 34 will be collectively referred to as the screen 28.

The upper hinge brackets 34 are made with an offset (See FIGS. 2 & 3) such that the rotation axis of the hinge is sufficiently far away from the leeward wall rail 20 that they do not interfere with the movement and operation of the bridge 22 and packer 24 when the screen 28 is down. However, when the screen is rotated up, the offset in the upper hinge brackets allows the screen to sit substantially on top of the rail 20.

A hydraulic cylinder 40 and a pair of legs 36 and 38 rotate the screen 28 about the hinge. The upper leg 36 is hinged on one end to one of the upper hinge brackets 34. A second end of the upper leg 36 is hinged to rod 42 of the hydraulic cylinder 40. The lower leg 38 is hinged on one end to an upper portion of the leeward wall 14. The lower leg 38 is further hinged on its second end to the rod 42 of the hydraulic cylinder 40. There are three objects hinged together at this point: the rod 42, the second end of the upper leg 36, and the second end of the lower leg 38. The hydraulic cylinder 40 is hinged at its lower end on a lower portion of the leeward wall 14.

The combination of the upper and lower legs hinged at the various places form a "scissor" action. It is this "scissor" action, in combination with force applied by the hydraulic cylinder, that rotates the screen 28 about the hinge 29 while maintaining an overall low profile so as not to substantially increase the width of the module builder or impede the operation of the bridge 22 and packer 24 assemblies.

More specifically and referring to FIG. 3, there will be seen a cross-section of the screen 28 in a down position. Raising the screen then is accomplished by adding hydraulic fluid to the hydraulic cylinder 40 such that the rod 42 begins to extend outward. Force is thereby applied to the apex formed by the upper and lower legs, 36 and 38 respectively, and as such a portion of that force is transferred to the upper hinge bracket and therefore the screen 28. The force exerted then tends to rotate the screen 28 about the hinge 29 until the lower portion of the screen contacts the rail 20 (FIG. 2). Lowering the screen is accomplished by reversing the flow of hydraulic fluid to the cylinder 40 such that the rod 42 is forced back in the cylinder 40. This force, by action of the "scissor", rotates the screen about the hinge 29 until the screen is in a down position. (FIG. 3).

This invention further includes a modification to the hoses 26 extending between the bridge 22 and the leeward wall 14. The modification is an attachment or arm 44 that extends the hoses from the bridge 22 out from the leeward wall 14 such that the hoses do not become tangled in the screen 28 or hinge components thereon.

Hydraulic fluid used to drive the hydraulic cylinder 40 is derived from the supply that normally drives the bridge 22 and packer 24. A selector switch changes the flow of the fluid between the bridge 22 and the hydraulic cylinder 40. Using the source that normally drives the bridge then ensures that the bridge and the screen are not operated simultaneously. This is desired because the screen 28, by sitting substantially on rail 20, would impede movement of the bridge 22 along the rail 20. The selector switch is located in cab 46 of the module builder. Further, it is desirable to have an indicating lamp to inform the module builder operator of the position of the selector switch so that inadvertent operation of either component is avoided.

Operation of the invention then is as follows. The module builder is placed as described above in description of the related art. Before dumping the stripped cotton in the module builder, the bridge 22 is moved to an extreme end. The screen 28 is raised such that it extends upward from the rail 20 on the leeward wall 14. Cotton is then dumped per the related art over the windward wall. Any cotton carried by the wind is then caught by the screen 28 whereas before the wind would have carried the cotton over the leeward wall 14. After the cotton has fallen off the screen 28, the screen 28 is lowered and the leveling and packing operation of the related art is performed.

The embodiment shown and described above is only exemplary. I do not claim to have invented all the parts, elements or steps described. Various modifications can be made in the construction, material, arrangement, and operation, and still be within the scope of my invention. For example, the bridge movement may be blocked while the screen is raised.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. An improved structure of a cotton module maker, said module maker having:
   a) a windward wall, a leeward wall, a front wall, and a back door,
   b) rails extending along a top of each of the windward and leeward walls,
   c) a bridge extending between the rails of the windward and leeward walls capable of movement between the front wall and the back door,
   d) a packer mounted on said bridge, and
   e) hydraulic hoses extending from an outside center portion of the leeward wall to the bridge,
   f) said hoses carrying high pressure hydraulic fluid facilitating movement of the bridge and operation of the packer,
wherein the improvement comprises;
   g) a screen extending above the rails on the leeward wall and said screen attached to the leeward wall.

2. The structure as defined in claim 1 further comprising;
   h) the screen being air permeable.

3. The structure as defined in claim 1 further comprising;
   h) said screen being an air permeable wire mesh,
   i) said screen having a height of approximately two fifths of a height of the leeward wall,
   j) said screen being a length of about ¾ of a length of the leeward wall.

4. The structure as defined in claim 1 further comprising;
   h) a screen hinge connecting a lower portion of said screen to an upper portion of said leeward wall.

5. The structure as defined in claim 4 further comprising;
   i) said screen being air permeable.

6. The method of filling a module maker with stripped cotton, said module maker having:
   a) a windward wall, a leeward wall, a front wall, and a back door,
   b) rails extending along a top of each of the windward and leeward walls, and
   c) a bridge with a packer on said rails,
wherein said improved method comprises;
   d) moving a screen proximate to and extending upward from the rail on the leeward wall,
   e) dumping stripped cotton over the windward wall into the module maker,
   f) catching the stripped cotton carried by a wind on a windward side of the screen,
   g) allowing the stripped cotton caught by the screen to fall into the module maker,
   h) moving said screen away from extending upward from said rail,
   i) moving said bridge along said rails, and therewith leveling and packing said stripped cotton.

7. The method as defined in claim 6 wherein said step of moving the screen proximate to and extending upward from the rail is accomplished by;
   j) rotating said screen about a hinge.

8. The method as defined in claim 6 wherein said step of moving said screen away from extending upward from a rail is accomplished by;
   j) rotating said screen about a hinge.

9. The method as defined in claim 8 wherein said step of moving the screen proximate to and extending upward from the rail is accomplished by;
   k) rotating said screen about a hinge.

10. The method as defined in claim 6 further comprising;
    j) holding hydraulic hoses connected to the bridge out from the leeward wall; thereby
    k) prohibiting the screen from fouling the hoses.

11. An improved structure of a cotton module maker, said module maker having:
    a) a windward wall, a leeward wall, a front wall, and a back door,
    b) rails extending along a top of each of the windward and leeward walls,
    c) a bridge extending between the rails of the windward and leeward walls capable of movement between the front wall and the back door,
    d) a packer mounted on said bridge, and
    e) hydraulic hoses extending from an outside center portion of the leeward wall to the bridge,
    f) said hoses carrying high pressure hydraulic fluid to facilitating movement of the bridge and operation of the packer,
wherein the improvement comprises;
    g) a screen extending above the rails on the leeward wall and said screen attached to the leeward wall,
    h) a screen hinge connecting a lower portion of said screen to an upper portion of said leeward wall,
    i) an upper leg hinged at a screen end to the screen,
    j) a lower leg hinged at a wall end to the upper portion of the leeward wall,
    k) each of said legs having a second end hinged together forming a "scissor" structure,
    l) a hydraulic cylinder hinged to the leeward wall, and
    m) a rod of said hydraulic cylinder hinged to the lower leg.

12. The structure as defined in claim 11 further comprising;
    n) said screen being air permeable.

13. The structure as defined in claim 11 further comprising;
    n) said rod hinged at a hinge point of the second ends of the legs.

14. The structure as defined in claim 11 further comprising;
    n) an arm extending out from the bridge,
    o) said hydraulic hoses attached to the arm.

15. An improved structure of a cotton module maker, said module maker having:
    a) a windward wall, a leeward wall, a front wall, and a back door,
    b) rails extending along a top of each of the windward and leeward walls,
    c) a bridge extending between the rails of the windward and leeward walls capable of movement between the front wall and the back door,
    d) a packer mounted on said bridge, and
    e) hydraulic hoses extending from an outside center portion of the leeward wall to the bridge,
    f) said hoses carrying high pressure hydraulic fluid to facilitating movement of the bridge and operation of the packer, wherein the improvement comprises;
- g) a screen extending upward from the rails on the leeward wall and said screen attached to the leeward wall,
- h) said screen being an air permeable wire mesh,
- i) said screen having a height of approximately two fifths of a height of the leeward wall,
- j) said screen having a length of approximately ¾ of a length of the leeward wall,
- k) a screen hinge connecting a lower portion of said screen to an upper portion of said leeward wall,
- l) an upper leg hinged at a screen end to the screen,
- m) a lower leg hinged at a wall end to the upper portion of the leeward sidewall,
- n) each of said legs having a second end hinged together forming a "scissor" structure,
- o) a hydraulic cylinder hinged to the leeward wall,
- p) a rod of said hydraulic cylinder hinged at a hinge point of the second ends of the legs.

16. The structure as defined in claim 15 further comprising;
- r) said hydraulic hoses extending to the bridge attached to an arm whereby the hoses are neither fouled by the screen nor the screen hinge upon movement of the bridge.

* * * * *